R. L. PICKERING.
CHALK LINE REEL.
APPLICATION FILED NOV. 9, 1909.

956,598.

Patented May 3, 1910.

UNITED STATES PATENT OFFICE.

RUBEN L. PICKERING, OF FALLING SPRING, WEST VIRGINIA.

CHALK-LINE REEL.

956,598. Specification of Letters Patent. Patented May 3, 1910.

Application filed November 9, 1909. Serial No. 527,019.

*To all whom it may concern:*

Be it known that I, RUBEN L. PICKERING, a citizen of the United States, residing at Falling Spring, in the county of Greenbrier and State of West Virginia, have invented a new and useful Chalk-Line Reel; and I do hereby declare the following to be a full, clear, and exact description of the invention, such as will enable others skilled in the art to which it appertains to make and use the same.

The invention relates to a chalking device.

The purpose of the invention is to provide a simple, efficient and durable device of this character having a reel adapted to wind a chalk line or cable and means for locking the reel at any desired point so that several marks of the same length may be made with the line.

Another object of the invention is to provide a device of this character having a receptacle or cup adapted to carry the chalk and a removable top therefor and so constructed that the chalk receptacle does not project beyond the sides of the reel.

With these and other objects in view the invention consists in the novel construction and arrangement of parts hereinafter described and shown and particularly pointed out in the appended claims.

In the drawings:—Figure 1 is a side elevation of a chalk reel constructed in accordance with this invention. Fig. 2 is a vertical sectional view. Fig. 3 is a plan view showing the removable door which covers the chalk cup. Fig. 4 is a plan view of another end of the reel showing the crank handle by which the same is operated.

Referring to the drawings, 1 and 2 designate the oppositely disposed plates which form sides of the reel. Plates 1 and 2 are provided with radially projecting arms 3 and 4, which are depressed as shown, and are connected together by means of rods 5, which are provided with shoulders 6 at each end thereof. The shoulders 6 prevent the plates from having an inward movement. Pivotally engaging the plate 1 is a cup 7 which engages an inward projection or flange 8 of the plate 1. The inward projection or flanges 8 is designed to prevent the displacement of the cup 7. The plate 2 is provided with an inward depression 9 in which depression is seated a rotatable plate 10. The revolving plate 10 is rigidly connected to a rod 11. The rod 11 extends inwardly through the cylindrical portion or sleeve 12 of the reel. The end 13 of the rod 11 abuts against the wall of the cup 7. The rod 11 is provided with an aperture, which registers with an aperture in the cylindrical portion sleeve 12 and in which aperture is inserted a cotter pin 14, the ends 15 of which are upset after passing through these apertures. The pin 14 is used as a suitable means with which to connect the cable or chalk line 16, which is used for the marking of timbers or other things. It will be seen that when the cotter pin 14 is inserted that the rod 11 and the cup 7, the cylindrical portion 12 and the plate 17 can all be rotated together. Pivotally connected with the plate 10 is a handle 18 which is hinged, as shown at 19. The handle 18 is provided with a lug or projection 20. When the desired length of the cable has been unwound from the cylindrical portion 12 the cylinder 12 can then be locked against further action by folding the handle inwardly so that the lug 20 passes through an aperture 21 in the plate 10 and locks the plate 10 against rotation by passing on into aperture 22, which is formed in a depressed portion 9 of the plate 2. It will be seen that the length of the chalk line or cable can be unwound to the desired length and as many marks made with that length as desired, and then the lug 20 can be withdrawn from the apertures 21 and 22, which will permit the length of the cable to be used in marking, to be again adjusted.

The cup 7 is provided with a cover 23 and is provided with flanges 24 which overlap the plate 1, thus preventing the cover from falling into the plate. The cover 23 is rigidly connected with a spring arm 25, which arm is pivotally mounted on one of the rods 5. The arm 25 is provided with a hinged grip 26, which can be folded inwardly or outwardly when not in use.

It will be seen that my invention is simple, inexpensive and durable, and that it can be carried in the pocket of a mechanic or other artisan and can readily be used for marking, as will be readily understood.

Having thus described the invention, what is claimed as new and useful is:—

1. In a chalk line reel, a pair of plates having depressed portions, said depressed portions being provided with rods for rigidly connecting the two plates together, one of said plates having a central depression, said central depression being provided with apertures, a sleeve extending between said plates and capable of rotation, a rotatable plate mounted in said central depression, and having an aperture adapted to be brought into registration with said first named apertures, a handle pivotally mounted on said revolving plate, a lug carried by said handle and adapted to engage the aperture in said revolving plate and one of the apertures in said central depression, for locking said cylinder against rotation.

2. In a chalk line reel, a pair of plates connected together by rods, a sleeve disposed between said plates and capable of rotation, one of said plates having a depression, a rotatable plate mounted in said depression, said rotatable plate being rigidly connected with a rod, said rod being adapted to rotate said sleeve, a handle carried by said rotatable plate and adapted to lock said rotatable plate against rotation.

3. In a chalk line reel, the combination of a pair of oppositely disposed plates, a sleeve arranged between said plates, said sleeve having an enlarged end forming a cup, a spring arm pivotally mounted on one of said plates, a cover connected with said spring arm and adapted to form a closure for said cup, and a foldable handle mounted on said closure.

In testimony whereof I have signed my name to this specification in the presence of two subscribing witnesses.

RUBEN L. PICKERING.

Witnesses:
 DEAN SWIFT,
 J. THOMAS SOTHORON.